April 8, 1924.  L. McCOLLOUGH  1,489,954
HARROW
Filed Oct. 1, 1921
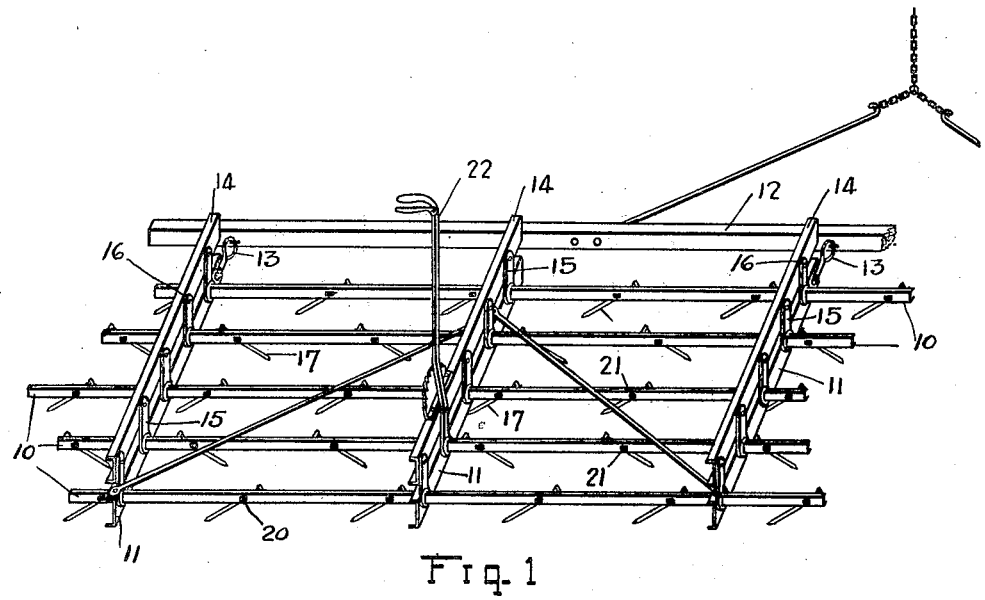
Fig. 1
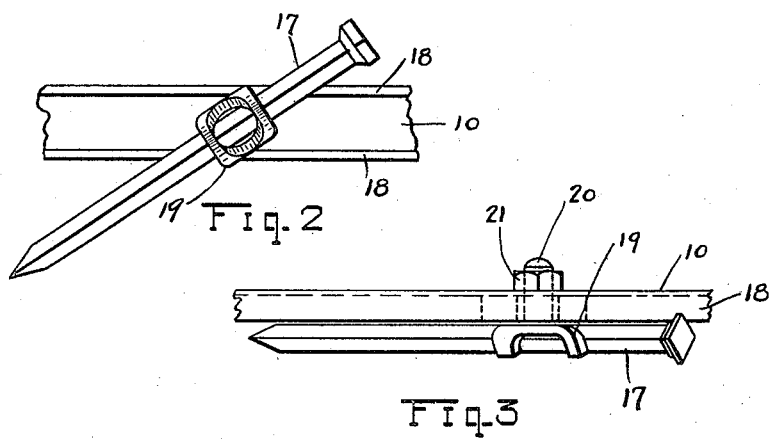
Fig. 2
Fig. 3
Inventor
Levi McCollough.
By Franklin H. Hough
Attorney Patented Apr. 8, 1924.

1,489,954

UNITED STATES PATENT OFFICE.

LEVI McCOLLOUGH, OF BELGRADE, MONTANA.

HARROW.

Application filed October 1, 1921. Serial No. 504,653.

*To all whom it may concern:*

Be it known that I, LEVI McCOLLOUGH, a citizen of the United States, residing at Belgrade, in the county of Gallatin and State of Montana, have invented certain new and useful Improvements in Harrows, of which the following is a specification, reference being had therein to the accompanying drawings.

This invention relates to harrows and has for an object to provide a harrow of new and improved construction embodying new and improved features of adjustability.

A further object of the invention is to provide a harrow having rotatably adjustable bars with teeth attached thereto at an angle responding to the adjustment of the bars to vary the angular relation to the ground.

With these and other objects in view the invention comprises certain novel parts, units, elements, combinations, arrangements, functions, and mechanical movements, as disclosed in the drawing, together with equivalents thereof as will be hereinafter more fully described and claimed.

In the drawings:

Figure 1 is a perspective view of one unit of the harrow attached to a draft bar shown broken to indicate the attachment of other similar units thereto;

Figure 2 is a view in elevation of one of the bars with one of the teeth attached thereto, and Figure 3 is a view in plan of one of the bars with one of the teeth attached thereto.

Like characters of reference indicate corresponding parts throughout the several views.

The improved harrow which forms the subject matter of this application comprises a plurality of bars 10 extending transversely of the line of travel of the harrow and connected adjustably in any usual and ordinary manner. As shown in the drawings the attachment and adjustment comprises a plurality of spaced bars 11 relative to which the bars 10 are pivoted to rotate upon their axes. The bars 11 are attached to the draw bar 12 in any approved manner, as by the links 13.

The adjustment and rotation of the bars 10 relative to the bars 11 is accomplished in any approved manner, here shown as providing a plurality of cleats 14 spaced above the bars 11 with arms 15 rigidly attached to the bars 10 and extending upwardly and pivoted to the cleats 14 at 16. No particular claim is made for novelty in regard to the specific type of structure to accomplish the simultaneous and synchronous rotation of the bars 10 or the manner of attaching to the draft.

The bars 10 are preferably composed of angle iron, as shown more particularly at Figures 2 and 3 and the teeth 17 extend upon the flanges 18 at an angle to the longitude of the bars 10, as shown more particularly at said figures. The teeth upon alternate bars 10 are preferably inclined in opposite directions, as shown more particularly at Figure 1 so that, while Figure 2 shows such angular relation to the bar 10 it is to be understood that upon alternate bars the angularity of the teeth 17 to the bar 10 would be reversed.

The tooth is held in proper engagement by means of a clip 19 embracing such tooth with a stud 20 extended through the bar 10 and threaded and provided with a nut 21. In this manner the teeth are held in their angular position relative to the bar, which angularity can be changed at the will of the operator and it is to be understood that the exact angularity as indicated at Figures 1 and 2 is not essential to the present invention.

It will also be obvious that as the bars 10 are rotated upon their major axes, which major rotation is accomplished by means of a manual lever 22, the angularity of the teeth to the ground upon which it is operating will be varied, notwithstanding the fact that the angularity relative to the bars remains constant. In this manner a new function is accomplished and a new implement presented for use, capable of having the angularity relative to the ground changed while retaining its fixed angularity relative to the supporting bar.

What I claim to be new is:

A harrow comprising a plurality of spaced bars extending transversely to the line of travel, substantially straight pointed teeth rigidly secured to the bars and inclined in planes parallel with said bars, the teeth of proximate bars being inclined in opposite directions, and manual means to simultaneously and similarly adjust the said bars rotatively upon their own axes.

In testimony whereof I hereunto affix my signature in presence of two witnesses.

LEVI McCOLLOUGH.

Witnesses:
B. B. LAW,
W. L. HAYS.